G. H. HANNA, J. D. FILBIN & F. AMSDEN.
CARRIER OR TRUCK FOR CANS.
APPLICATION FILED JUNE 7, 1913.
1,102,658.
Patented July 7, 1914.
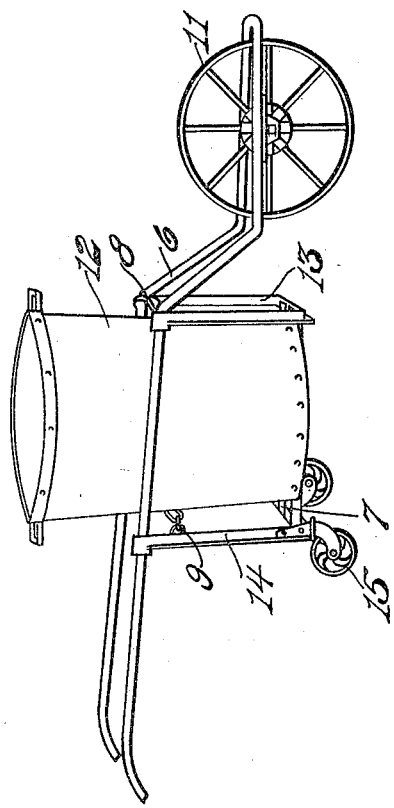

UNITED STATES PATENT OFFICE.

GUSTAV H. HANNA, JAMES D. FILBIN, AND FRED AMSDEN, OF CLEVELAND, OHIO.

CARRIER OR TRUCK FOR CANS.

1,102,658. Specification of Letters Patent. Patented July 7, 1914.

Application filed June 7, 1913. Serial No. 772,281.

*To all whom it may concern:*

Be it known that we, GUSTAV H. HANNA, JAMES D. FILBIN, and FRED AMSDEN, citizens of the United States, residing at Cleveland, in the county of Cuyahoga and State of Ohio, have invented certain new and useful Improvements in Carriers or Trucks for Cans, of which the following is a specification.

This invention is a carrier or truck for cans, and is especially adapted and intended for the use of street cleaners, for carrying cans in which sweeping and other refuse may be deposited. It is also useful for the purpose of carrying garbage and ash cans.

The object of the invention is to provide an improved device for the purpose stated, the can being carried in such position that it can be easily removed from the truck for the purpose of being emptied. The truck is of cheap and light construction, and may be easily manipulated for the intended purpose.

The invention is illustrated in the accompanying drawing which is a perspective view of the device.

The main frame of the truck is indicated at 6 and conveniently consists of a length of pipe bent to form a loop at the front end and two handles at the rear end, the loop being dropped to suit the elevation of the wheel 11 which is mounted therebetween with axle bearings under each branch of the loop. The can 12 is carried between the two side bars of the frame, upon a platform consisting of slate 7 supported by front and rear hangers 13 and 14, conveniently consisting of U-shaped angle irons the upper ends of which are connected to the respective bars of the frame. A cross piece 8 connects the bars at the front, and serves to prevent the can tilting or slipping forwardly, as well as to brace and connect the bars of the frame. At the rear of the can, a chain 9 is provided, which may be hung across from one bar to the other to hold the can in place, or detached at one end to enable the can to be slipped out rearwardly between the handles and onto the ground. The rear hanger 14 carries a pair of caster wheels 15 on which the rear part of the truck or cart is mounted.

The cart enables the can to be easily carried from place to place, as in street cleaning operations, and when full it can be slipped out between the handles and left on the ground for the collecting wagon.

What we claim as new is:

A hand cart or carrier comprising spaced handle bars with a wheel at the front thereof, front and rear hangers depending from said bars, a platform supported by said hangers, a cross piece connecting the handle bars above the front end of the platform, a detachable connection between the handle bars above the rear end of the platform, and caster wheels carried by the rear hanger.

In testimony whereof, we do affix our signatures in presence of two witnesses.

GUSTAV H. HANNA.
JAMES D. FILBIN.
FRED AMSDEN.

Witnesses:
D. C. REED,
JOHN A. BOMMHARDT.

Copies of this patent may be obtained for five cents each, by addressing the "Commissioner of Patents, Washington, D. C."